United States Patent
Dinesen

(10) Patent No.: US 9,256,048 B2
(45) Date of Patent: Feb. 9, 2016

(54) LENS DRIVING DEVICE

(71) Applicant: Palle Geltzer Dinesen, Shenzhen (CN)

(72) Inventor: Palle Geltzer Dinesen, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/611,327

(22) Filed: Feb. 2, 2015

(65) Prior Publication Data

US 2015/0146313 A1   May 28, 2015

Related U.S. Application Data

(62) Division of application No. 13/438,719, filed on Apr. 3, 2012, now Pat. No. 8,995,067.

(51) Int. Cl.
| | |
|---|---|
| *G02B 7/04* | (2006.01) |
| *G02B 7/08* | (2006.01) |
| *H02K 41/035* | (2006.01) |
| *G03B 3/10* | (2006.01) |
| *G03B 5/00* | (2006.01) |

(52) U.S. Cl.
CPC .. *G02B 7/04* (2013.01); *G02B 7/08* (2013.01); *G03B 3/10* (2013.01); *G03B 5/00* (2013.01); *H02K 41/0356* (2013.01); *G03B 2205/0069* (2013.01)

(58) Field of Classification Search
CPC ........ G02B 7/04; G02B 13/001; G02B 15/14; G03B 3/10; G03B 5/00; G03B 2205/0069; H02K 41/0356
See application file for complete search history.

(56) References Cited

U.S. PATENT DOCUMENTS 7,791,827 B2 * 9/2010 Lam ....................... G02B 27/62
                                                       359/824

* cited by examiner

*Primary Examiner* — Joseph P Martinez
(74) *Attorney, Agent, or Firm* — IPro, Inc.; Na Xu

(57) ABSTRACT

An lens holding device is disclosed. The lens holding device includes a stationary magnetic field generator having a housing and at least one magnet fixed on the housing, the housing having a receiving chamber; at least one elastic member attached to the stationary magnetic field generator; a movable magnetic field generator suspended in the receiving chamber by the elastic member and separated from the stationary magnetic field, the movable magnetic field generator having a lens holding device received in the housing for receiving at least a lens and a coil attached on the lens holding device and facing the magnet, the lens holding device having a lens barrel and a coil holder directly extending from the lens barrel for holding the coil. Wherein the lens barrel and the coil holder are integrated with each other, in which the pre-wind coil is then subsequently attached. This overcomes the issue of the coil deforming the lens barrel in the winding process.

7 Claims, 4 Drawing Sheets

LENS DRIVING DEVICE

CROSS REFERENCE TO RELATED APPLICATION

This application is a divisional application of U.S. Ser. No. 13/438,719 filed Apr. 3, 2013. The contents of these applications are incorporated by this reference.

FIELD OF THE INVENTION

The present invention relates to a lens driving device, and particularly to a lens driving device having an integrated lens holder.

DESCRIPTION OF RELATED ART

A typical lens driving device includes a lens module, a coil directly wound around an outer circumferential surface of the lens module, a stationary magnetic field generator separated from the coil and interacted with the coil for generating an electromagnetic force for driving the coil together with the lens module to move approaching or away along the optical axis, and at least one elastic member attached to the stationary magnetic field generator and the lens module, respectively. The lens module has a lens group and a lens barrel accommodating the lens group therein.

The movable magnetic field generator interacts with the coil to generate an electromagnetic force for driving the coil to move approaching or away along the optical axis, thereby driving the lens module to move approaching or away along the optical axis.

However, as the coil is directly wound around the lens barrel, it causes an issue that the coil deforms the lens barrel during the winding process.

So, it is necessary to provide a new lens holding device for solving the problem mentioned above.

DETAILED DESCRIPTION OF THE EMBODIMENT

Reference will now be made to describe an exemplary embodiment of the present invention in detail.

Figure 1:
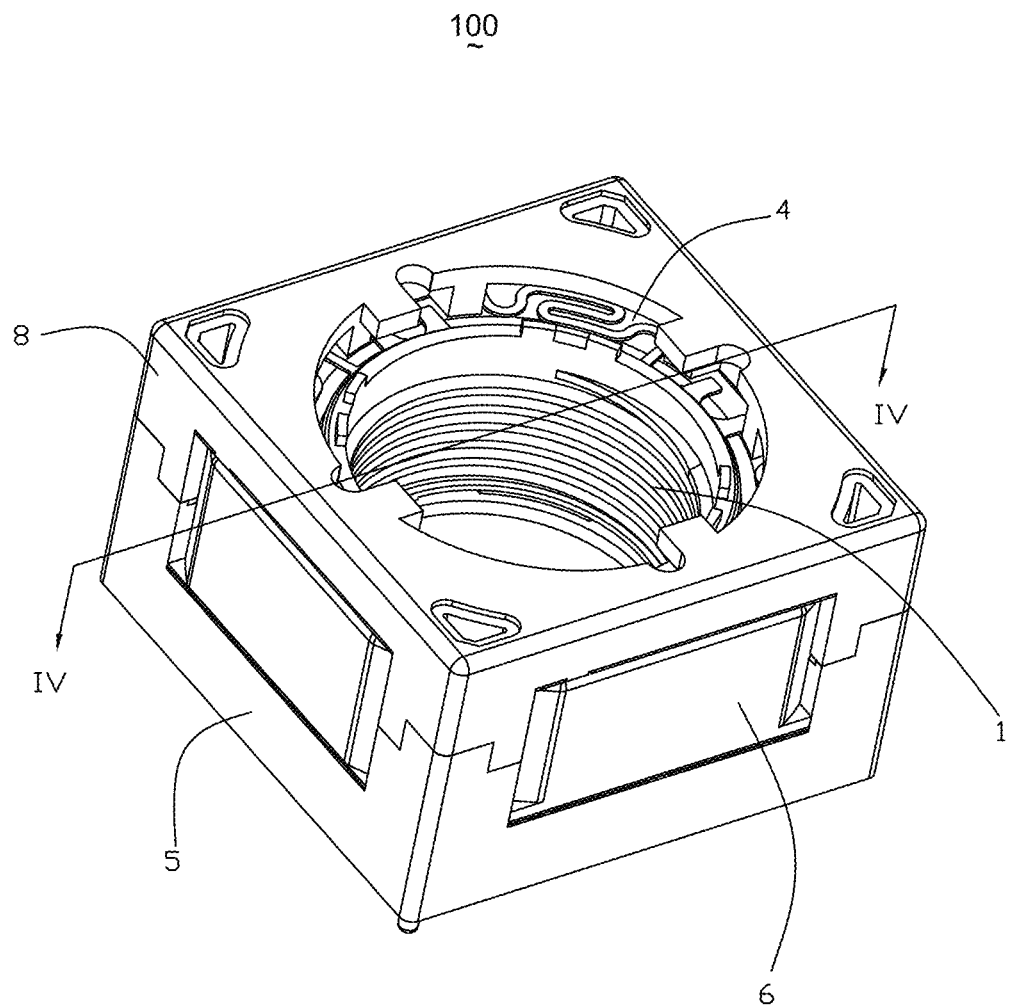
FIG. 1 is an illustrative assembled view of a lens driving device in accordance with an exemplary embodiment of the present invention.

Referring to FIGS. 1 though 4, a lens driving devices 100 comprises a stationary magnetic field generator (not labeled) having a receiving chamber (not labeled), at least one elastic member 4 attached to the stationary magnetic field generator generator, a movable magnetic field generator (not labeled) suspended in the receiving chamber by the elastic member 4. The movable magnetic field generator has a lens holding device 1 and a coil 2 attached on the lens holding device 1. The stationary magnetic field generator is separated from the movable magnetic field generator for generating an electromagnetic force for driving the movable magnetic field generator to move approaching or away along an optical axis of the lens.

Figure 3:
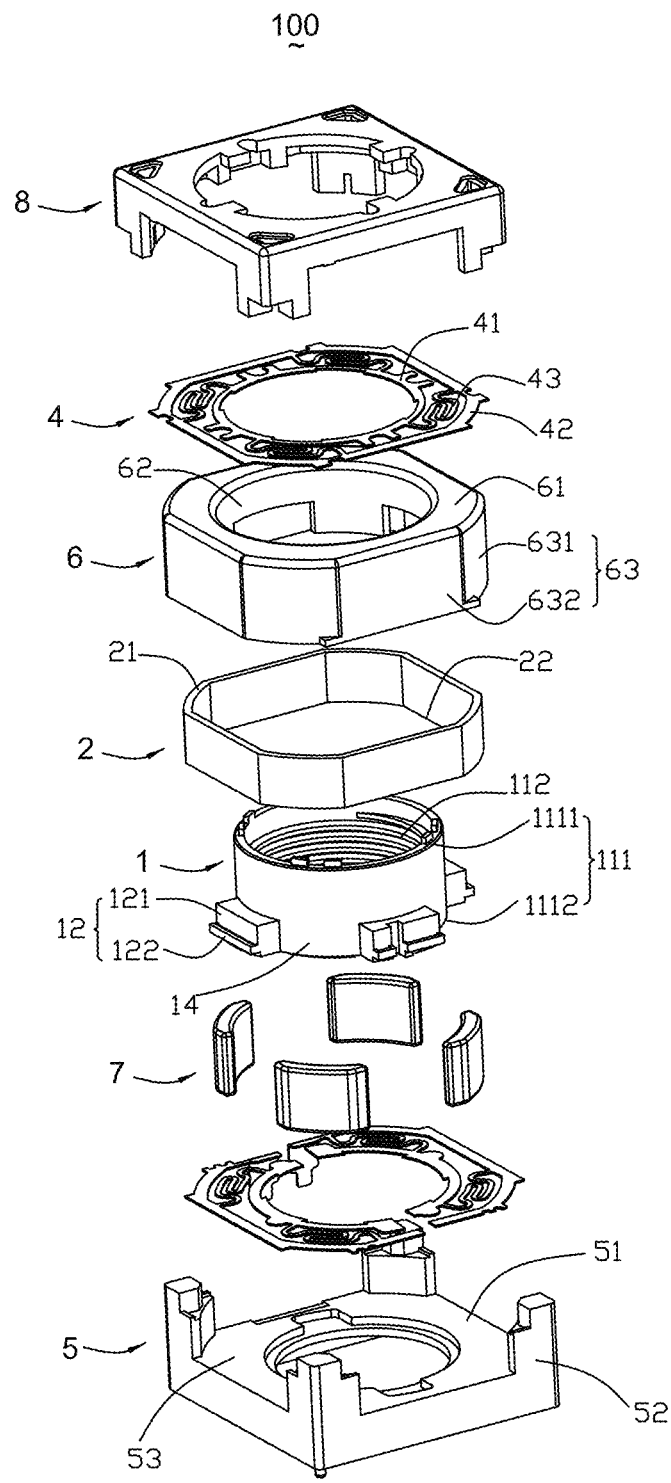
FIG. 3 is an exploded view of the lens driving device.

Referring to FIG. 3, the stationary magnetic field generator has a housing (not labeled), a octagonal-shaped yoke 6 mounted on the housing, four magnets 7 received in the yoke 6, and a receiving chamber surrounded by the housing and the yoke 6 for receiving the coil 2 and the lens holding device 1.

Referring to FIG. 3, the housing has a base 5 and a cover 8 mounted on the base 5. The base 5 has a bottom 51, four side portions 52 extending upwardly and perpendicularly from corresponding four corners of the bottom 51 and spaced apart from each other, and four receiving gaps 53 formed by each adjacent side portions 52. The yoke 6 has a flat wall portion 61, an inner peripheral portion 62 extending from the flat wall portion 61, and an outer peripheral portion 63 extending from the flat wall portion 61 and spaced apart from the inner peripheral portion 62. The outer peripheral portion 63 has four arc-wall portions 631 set in space with respect to each other for engaging with the corresponding side portions 52 of the base 5 and four linear portions 632 smoothly connected each adjacent arc-wall portion 631 and received in the corresponding receiving gap 53 of the base 5, respectively. The inner peripheral portion 62 of the yoke 6 is annularly shaped. Each of magnets 7 is substantially triangularly shaped as viewed from the plane and fitted into a respective arc-wall portion 631 of the outer peripheral wall 63 of the yoke 6. The yoke is used for carrying the magnets and conducting magnetic fluxes, therefore, the shape of yoke is not limited to that described in this embodiment and shown in the figure, and could be any possible shape as long as a structure is provided for carrying the magnets. It is understood that in an alternative exemplary embodiment, the yoke can be omitted and the magnets may be fixed on the side portions of the housing directly or fixed on the housing via a medium (except yoke) which is directly connected with the housing.

Figure 4:
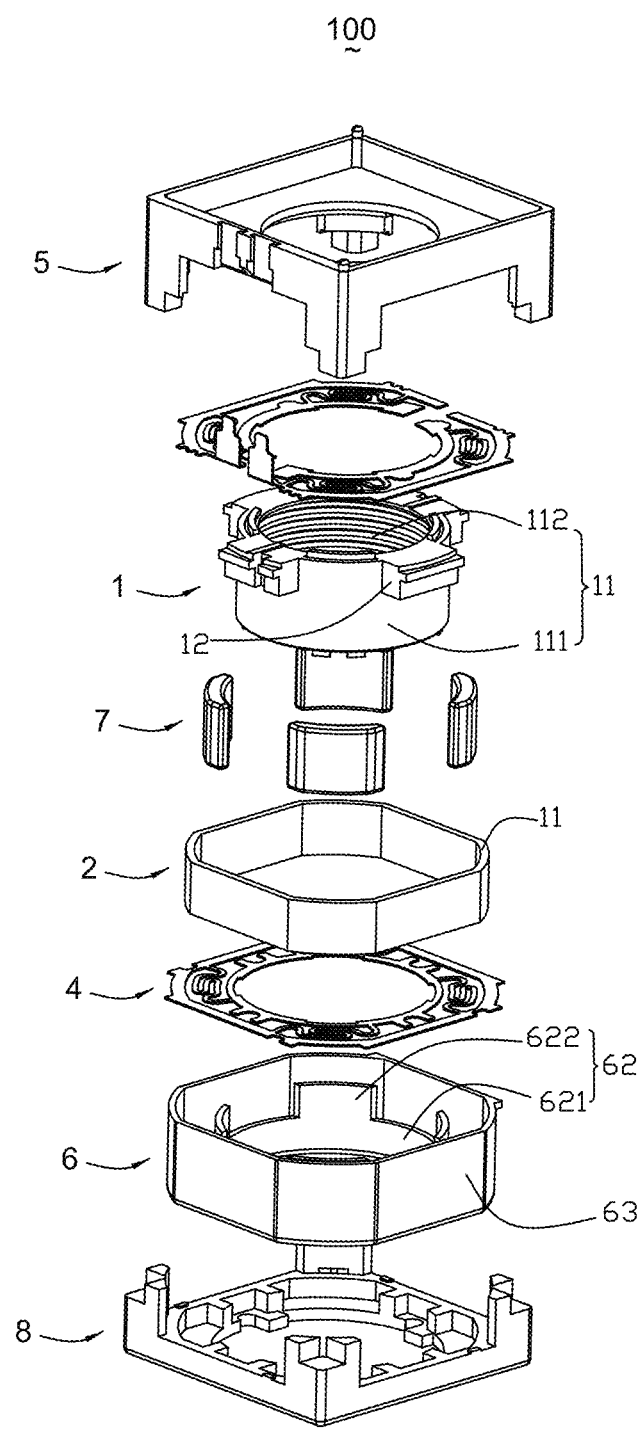
FIG. 4 is similar FIG. 3, but from another aspect.

Referring to FIGS. 3 and 4, the lens holding device 1 has a lens group or at least one lens (not shown), a cylindrical lens barrel 11 receiving the lens group, and a coil holder 12 directly extending from one end of the lens barrel 11 for holding the coil 2. The lens group has a plurality lens separated with each other in the optical axis. The cylindrical lens barrel 11 has a closed sidewall 111, an engaging hole 112 surrounded by the closed sidewall 111 for receiving the at least one lens or the plurality of lens, i.e., the lens group. The closed sidewall 111 of the lens barrel 11 has a first end 1111 near the base 5 and a second end 1112 far away from the base 5. The coil holder 12 has a supporting portion 121 directly extending from the first end 1111 of the closed sidewall 111 of the lens holder 11 and a supporting step 122 extending from the supporting portion 121 and away from the engaging hole 112 of the lens barrel 11 for fixing the coil 2 together with the supporting portion 121. The lens holding device 1 is configured as one-piece. In other words, the lens barrel and the coil holder are integrated with each other. The lens barrel 11, the coil holder 12 and the lens group may be manufactured by injection molding.

Figure 2:
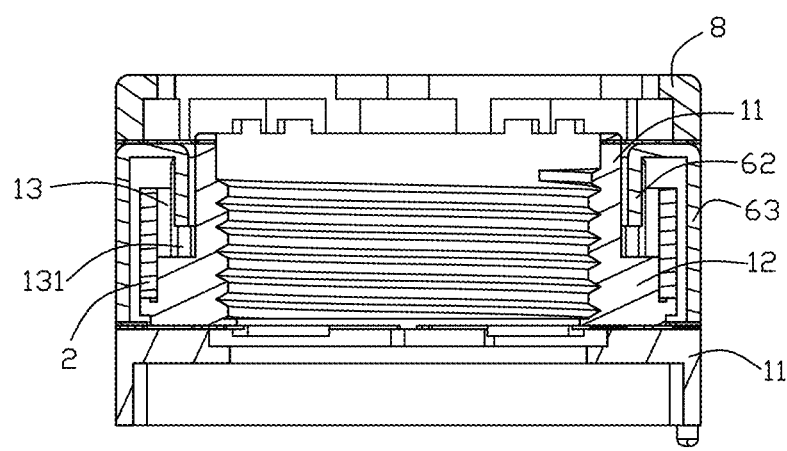
FIG. 2 is an enlarged cross-sectional view of the speaker taken along line IV-IV in FIG. 1.

Referring to FIGS. 2 though 4, the coil 2 is columned configuration and made of metal wire, such as copper wire. The coil 2 has an upper end 21 and a lower end 22 opposite to the upper end 21. When assembled, a lower end 22 of the coil 2 is engaged with the supporting portion 121 and the supporting step 122. The lens driving device 1 further has a inserting space 13 surrounded by the coil 2, the coil holder 12 and together with an outer peripheral of the closed sidewall 111 of the lens barrel 11 for receiving the inner peripheral portion 62 of the yoke 6. A height of the closed sidewall 111 of the lens barrel 11 is larger than that of the supporting portion 121 adding a height of the inner peripheral wall portion 62 of the yoke 6. Therefore the inserting space 13 has a vibrating space 131 placed between an outer peripheral of the closed sidewall 111, an upper surface of the supporting portion 121 and a lower surface of the inner peripheral wall portion 62 of the yoke 6 in the optical axis for ensuring the lens holding device 1 together with the coil 2 move approaching or away along the optical axis.

Referring to FIGS. 3 and 4, in this exemplary embodiment, the coil holder 12 is divided into four coil holder segments (no labeled). Each adjacent coil holder segments together with the closed sidewall 111 of the lens barrel 11 has an extending space 14. The inner peripheral portion 62 of the yoke 6 has an annular portion 621 and four extending portion 622 extending from the annular portion 621 and away from the flat wall portion 61 of the yoke 6 at a position corresponding to the respective arc-wall portion 631 of the outer peripheral portion 63 of the yoke 6. Therefore, a height of the inner peripheral portion at a position corresponding to each arc-wall portion of the outer peripheral portion is larger than that of the inner peripheral portion at a position corresponding to each linear portion of the outer peripheral portion. Each extending portion 622 of the inner peripheral portion 62 of the yoke 6 is inserted into the respective extending space 14 of the lens holding device 1, thereby enhancing the electromagnetic force for driving the coil 2.

Referring to FIG. 3, the elastic member 4 has an inner portion 41, an outer portion 42 separated from the inner portion 41 and having a diameter that is larger than that of the inner portion 41, and a connecting portion 43 connected with the inner and outer portions 41 and 42 and set in a space between these portions 41 and 42, respectively. The outer portion 42 of the elastic member 4 is mounted on the flat wall portion 61 of the yoke 6 and the inner portion 41 is connected with the first end 1111 of the closed sidewall 111 of the lens holding device 1 for suspending the lens holding device 1 together with the coil 2 in the receiving chamber. It is understood that in an alternative exemplary embodiment, the outer portion of the elastic member may be mounted on the housing.

In order to fix the coil on the coil holder firmly, the coil holder further has an outer wall extending from the supporting step toward the flat wall portion of the yoke for engaging with an outer peripheral of the coil. The mount of the lens, the magnets, the side portions of the base, the extending portions of the inner peripheral portion of the yoke, and the coil holder segments is not limited or restricted to four, and according to different desires, amount of these can be various.

The lens holding device has a lens barrel integrated with the coil holder, in which the pre-wind coil is then subsequently attached. This overcomes the issue of the coil deforming the lens barrel in the winding process. In addition, the space between the coil and the closed sidewall of the lens barrel allows a yoke with an inner peripheral portion to be fitted therein.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A lens driving device, comprising:
   a stationary magnetic field generator having a housing and at least one magnet fixed on the housing, the housing having a receiving chamber;
   at least one elastic member attached to the stationary magnetic field generator;
   a movable magnetic field generator suspended in the receiving chamber by the elastic member and separated from the stationary magnetic field generator, the movable magnetic field generator having a lens holding device received in the housing and a coil attached on the lens holding device and facing the magnet, the lens holding device having a lens barrel and a coil holder directly extending from the lens barrel for holding the coil, the lens barrel having a closed sidewall and an engaging hole surrounded by the closed sidewall; and
   at least one lens received in the engaging hole of the movable magnetic field generator;
   wherein the lens barrel and the coil holder are integrated with each other.

2. The lens driving device as described in claim 1, wherein the lens barrel, the coil holder and the at least one lens are manufactured by injection molding.

3. The lens driving device as described in claim 1, wherein the coil holder has a supporting portion extending from one end of the closed sidewall of the lens barrel and a supporting step extending from the supporting portion and away from the engaging hole of the lens barrel for fixing the coil together with the supporting portion.

4. The lens driving device as described in claim 3, wherein, the coil holder further has an outer wall extending from the supporting step toward the another end of the closed sidewall for engaging with an outer peripheral of the coil.

5. The lens driving device as described in claim 1, wherein the coil holder is divided into plurality of coil holder segments and each adjacent coil holder segments together with the closed sidewall of the lens holder has an extending space.

6. The lens driving device as described in claim 5, wherein the housing has a bottom and a plurality of side portions extending upwardly and perpendicularly from the bottom and spaced apart from each other, and receiving gaps formed by each adjacent side portions.

7. The lens driving device as described in claim 6, wherein each of coil holder segment extends from the closed sidewall toward the corresponding receiving gap of the base.

\* \* \* \* \*